(12) United States Patent
Hartung et al.

(10) Patent No.: US 7,305,074 B2
(45) Date of Patent: Dec. 4, 2007

(54) COMMUNICATION SYSTEM CONTROL METHOD

(75) Inventors: Frank Hartung, Herzogenrath (DE); Frank Hundscheidt, Kerkrade (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 290 days.

(21) Appl. No.: 10/544,964

(22) PCT Filed: Feb. 12, 2003

(86) PCT No.: PCT/EP03/01381

§ 371 (c)(1),
(2), (4) Date: Aug. 8, 2005

(87) PCT Pub. No.: WO2004/072874

PCT Pub. Date: Aug. 26, 2004

(65) Prior Publication Data

US 2006/0153351 A1 Jul. 13, 2006

(51) Int. Cl.
*H04M 15/00* (2006.01)

(52) U.S. Cl. ............... 379/114.03; 379/114.18; 379/115.01; 455/406

(58) Field of Classification Search ............... 379/111, 379/114.01, 114.03, 114.05, 115.01, 116, 379/118, 121.01, 144.01, 144.06; 455/405–408
See application file for complete search history.

(56) References Cited

U.S. PATENT DOCUMENTS

| 6,279,112 B1 * | 8/2001 | O'Toole et al. ............... 726/10 |
| 6,651,072 B1 * | 11/2003 | Carino et al. ............. 707/104.1 |
| 6,657,962 B1 * | 12/2003 | Barri et al. .................. 370/235 |
| 2002/0069244 A1 * | 6/2002 | Blair et al. .................. 709/203 |
| 2002/0128972 A1 | 9/2002 | Pirolli et al. |
| 2002/0161709 A1 | 10/2002 | Lunde et al. |

FOREIGN PATENT DOCUMENTS

WO WO 01 54410 A 7/2001

* cited by examiner

*Primary Examiner*—Binh K. Tieu (57) ABSTRACT

A method of controlling the operation of a communication system is described, where the system comprises a first entity 2 for sending a first data object 21 to a terminal device 4 and a second entity 3 for sending a second data object to the terminal device at the request 41 of the terminal device 4. The communication system also comprises a data transfer entity 11 and a charging entity 5. The data transfer entity 11 records charging relevant parameters related to the transfer of the first data object. It is proposed that the second entity 3 is controlled to output a predetermined triggering message to the data transfer entity 11 and/or charging entity 5, where the operation of processing the charging relevant parameters in a charging procedure is postponed until the predetermined message is received.

46 Claims, 7 Drawing Sheets

COMMUNICATION SYSTEM CONTROL METHOD

FIELD OF THE INVENTION

The present application relates to a method of controlling the operation of a communication system, to methods of controlling individual entities in such a communication system, and to the individual entities in the communication system. More specifically, the present application deals with improved ways of controlling an overall charging operation in a communication system, to thereby allow a more flexible charging and billing of services.

BACKGROUND OF THE INVENTION

In the field of telephone communications, a well-known charging concept consists in recording one or more parameters related to the transfer of information to a terminal and then performing charging and billing on the basis of such recorded parameters. For example, in standard telephone systems the amount of time for a call communication is recorded as a basis for billing this call communication. Another example of a parameter related to the transfer of information to a terminal device is the amount or volume of transferred data.

In a communication network, such as a telephone network, an entity for handling communications to and from a terminal device can record the above-mentioned parameters and appropriately forward these parameters to a charging entity that handles the charging and billing of services to users of terminal devices.

The term "entity" as used in the present specification and claims refers to a functional element assigned to provide a certain function in a communication system. An entity can therefore be provided by hardware, software or any suitable combination of hardware and software. An entity can be provided at one physical location, e.g. be provided by software running on a given server, or can be spread out over several physical locations, e.g. can be provided by software running in a distributed architecture.

Recently, a concept for distributing information to users has been proposed, which is called Digital Rights Management (DRM). In DRM content is not simply passed to a user of a terminal device, but much rather two data objects are generated, a first data object known as a content object and a second data object know as a rights object. The content objects are handled by a distribution entity and the rights objects are handled by a rights entity, which entities can be provided by two respective servers, or also by a single server. The basic idea of DRM is that the content in the content object is not readily accessible to the user of the terminal device, and that the rights object is necessary for gaining access to the content. Therefore, after having received the content object, a user will request from the rights entity a rights object associated with the down-loaded content object, in order to be able to access the content of the content object.

The content object can be of any desired nature, e.g. containing audio information (such as a music file), or a combination of audio and video information (such as a video clip) or can be data of other nature (such as a text or a computer game). The rights object can also have any desired nature, e.g. provide one-time access to the content object, or unrestricted access. As an example, the content in the content object can be encrypted, and the rights object comprises information for decrypting said content.

OBJECT OF THE INVENTION

It is the object of the present invention to provide improved control methods and associated entities for communication systems in which first and second data objects are provided to a terminal device, said first and second data units being associated in a predetermined way, in view of making the charging and billing operation more flexible.

SUMMARY OF THE INVENTION

The object is solved by the basic methods of claim 1 and claim 6 and by the methods and devices described in the other independent claims. Advantageous embodiments are described in the dependent claims.

The invention relates to the control of a communication system that comprises a first entity for sending a first data object to a terminal device, a second entity for sending a second data object to the terminal device, said second data object having a predetermined association with the first data object, a data transfer entity for transferring data to the terminal device and recording one or more charging relevant parameters associated with the transfer of data to the terminal device, where the data transfer entity is arranged to transfer the first data object to the terminal device, and the data transfer entity is part of a communication network, and a charging entity for collecting and processing charging information related to the providing of communication services by the communication network, where the data transfer entity is arranged for providing recorded charging relevant parameters to the charging entity.

In this communication system, the first and second entity may or may not be part of the mentioned communication network, and equally the charging entity may or may not be a part of this communication network. As an example, the communication network can be a telephone network, such as a mobile telephone network or a fixed line telephone network. As a consequence, the data transfer entity can be any entity in the network that handles the transfer of data, such as a node in a telephone network.

The first entity may send the first data object at the request of the terminal device or at the request of some other entity, e.g. in a network push situation. Equally, the second entity may send the second data object to the terminal device at the request of the terminal device, or at the request of some other entity.

Preferably, the first data object comprises data to be accessed by a user of the terminal device, and the second data object comprises information for enabling access to the data of the first data object, e.g. the first data object can be a content object and the second data object can be a rights object. However, it is to be noted that the present invention is by no means restricted to this example and can be applied to any system in which a first and second data object are sent to a terminal device, said first and second data object being associated in a predetermined way.

The correlation between the first and second data object can be provided in any suitable or desirable way, e.g. with the help of a known identifying scheme such as URI (Universal Resource Indicator) or any similar scheme.

In accordance with the present invention, the first entity is controlled to send the first data object to the terminal device, and the data transfer entity is controlled to record one or more charging relevant parameters related to the transfer of the first data object to the terminal device. The one or more charging relevant parameters can be selected in any suitable or desirable way, and can e.g. be the amount or volume of data transferred with the first data object and/or the amount of time necessary for transferring the first data object.

According to a first aspect of the invention, the second entity is controlled in such a way that after having received a request for sending the second data object to the terminal device, the second entity outputs a predetermined message to the data transfer entity, and the data transfer entity is controlled to make the providing of the one or more recorded charging relevant parameters that relate to the transfer of the first data object dependent on the receipt of the predetermined message.

In other words, the forwarding of the charging relevant parameters recorded by the data transfer entity to the charging entity depends on receiving the predetermined message.

According to a second aspect, the second entity is controlled in such a way that after having received the request for sending the second data object to the terminal device, the second entity outputs a predetermined message to the charging entity, and the charging entity is controlled in such a way as to make the processing of the one or more charging relevant parameters related to the transfer of the first data object (said charging relevant parameters having been forwarded by the data transfer entity) dependent on the receipt of the predetermined message.

In other words, the processing of the charging relevant parameters for thereby performing a charging or billing operating on the basis of these charging relevant parameters is made dependent on the receipt of the predetermined message from the second entity.

The common concept of the present invention is thereby that the process of charging or billing on the basis of the parameters recorded for the transfer of the first data object is made dependent on a request for sending the second data object to the terminal device, e.g. a user of the terminal device requesting the second data object.

This basic concept of the invention provides one advantage in that it is possible to avoid charging or billing of the transfer of the first data object if sending of the second data object is never requested. This greatly increases the flexibility for the charging and billing operation. Namely, taking DRM as described in the introduction as an example, it is well possible that an end user has down-loaded a content object, or has received the content object via a so-called network-push (i.e. he has not requested the content object but has received it at the initiative of the network operator, e.g. in a course of an advertising campaign), but does not wish to retrieve the rights object. This can be due to a number of reasons, e.g. the user is not interested in the content, the content is outdated, the user has looked at a preview and is not interested in the rest of the content, the user is not willing to pay a fee that is levied for retrieving the rights object, the user has already received the same content before, etc. In such cases, the user will probably delete the content object without making use of it, i.e. without retrieving (and possibly paying) for the rights object. In accordance with the present invention, it is now possible that the charging and billing operation in such a case can be adapted to this situation, namely that no charging or billing is conducted if the end-user who received the first data object is not interested, i.e. does not retrieve the second data object.

Another advantage is that it is possible to make the rate applied to charging of the transfer of the first data object dependent on the time of requesting the sending of the second data object.

It may be noted that the possible debtor of services for transferring the first data object can be the end-user, but can also be a different party, e.g. a party that initiates a network-push operation, such as an advertiser. In any case, with the present invention it is possible to make the charging or billing operation with respect to the debtor more flexible. It is noted that the invention can be applied to any type of charging or billing operation, e.g. postpaid systems, prepaid systems or combinations of post- and prepaid systems.

BRIEF DESCRIPTION OF DRAWINGS

The present invention will now be described in more detail with respect to preferred embodiments, by making reference to the figures, in which.

DETAILED DESCRIPTION OF EMBODIMENTS

Although the following description of embodiments of the invention will make reference to specific examples of data objects, communication networks and corresponding entities, these examples only serve to provide a more comprehensive understanding and are not intended to be limiting.

Figure 1:
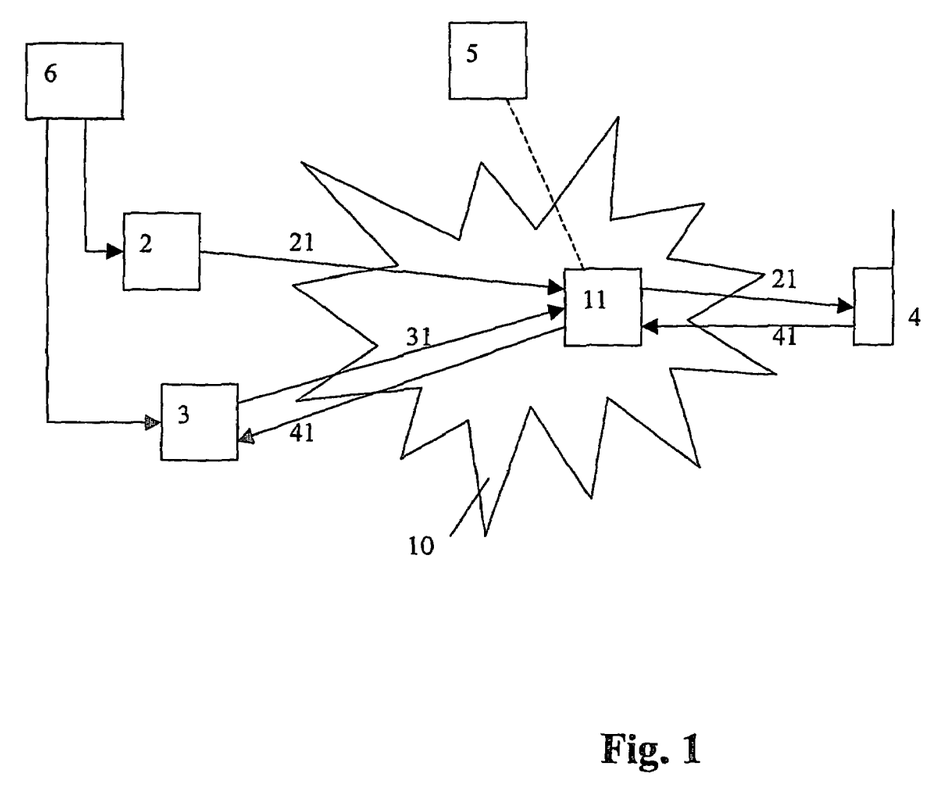
FIG. 1 shows a schematic representation of a communication network to which the present invention can be applied in one aspect.

FIG. 1 shows a schematic representation of a communication system to which the present invention can be applied. Reference numeral 2 represents a first entity for sending a first data object to a terminal device 4. For example, entity 2 can be a distribution server in a DRM system, for outputting content objects. The terminal device 4 is arranged to communicate with a network 10, where the communication to and from terminal device 4 is handled by a data transfer entity 11. For example, the network 10 can be a mobile telephone network, e.g. operating in accordance with GSM (Global System for Mobile communication), GPRS (General Packet Radio Service), UMTS (Universal Mobile Telephone System) or any other mobile telephone standard. Taking GPRS as an example, the data transfer entity can be a Gateway GPRS Support Node (GGSN) or a Serving GPRS Support Node (SGSN). If a network 10 is a mobile telephone network, then terminal device 4 is a mobile station. The communication network 10 can, however, also be some other form of telephone networks, e.g. a PSTN or a ISDN, in which case the terminal device 4 is an appropriate terminal for the given telephone network. The communication network 10 can also be a general data communication network, e.g. a network based upon the Internet protocol (IP), in which case the terminal device 4 is again an appropriate matching terminal, such as a personal computer (PC) attached to the IP based network.

The representation of communication network 10 is only schematic and for simplicity only one data transfer entity 11 is shown. As is well known to the skilled person, the communication network will generally comprise a plurality of data transfer entities for accomplishing communication within the network and to a variety of terminal devices communicating with the network.

FIG. 1 furthermore shows a second entity 3 for sending a second data object to the terminal device 4, at the request of said terminal device 4 or some other entity, where the second data object has a predetermined association with the first data object. For example, the second entity 3 can be a rights server in a DRM system.

The first and second entity 2, 3 are shown as being outside of network 10. However, it may be noted that they can also be part of network 10. FIG. 1 furthermore shows an entity 6 that provides the first and second data object to the first and second entity, respectively. In the context of DRM the entity 6 could be a so-called packager, i.e. an entity that receives content information from an appropriate content server and generates a content object and a rights object on the basis thereof. However, the present invention is not restricted to any specific mode of generating the first and second data objects, and it is e.g. also possible that the first and second data object are generated at the first or second entity and then provided to the respectively other entity.

FIG. 1 furthermore shows a charging entity 5 which is arranged to collect and process charging information related to the providing of communication services by the communication network 10. The charging entity 5 is shown as being outside of network 10, but could equally well be a part of network 10.

In the communication system thus formed, the data transfer entity 11 is arranged to record one or more charging relevant parameters associated with the transfer of data to the terminal device 4. A dotted line between the charging entity 5 and the data transmit entity 11 represents that the data transfer entity 11 is arranged to provide recorded charging relevant parameters to the charging entity 5. The charging entity 5 is arranged to run charging/billing procedures, in accordance with which the charging relevant parameters are processed in order to generate bills or charging statements for users of the network 10.

In FIG. 1, arrows 21 represent the sending of the first data object to the terminal device 4. It is noted that the passing of the data object from the first entity 2 to the data transfer entity 11 may involve a plurality of further data transfer entities in the network 10, which are not shown for simplicity. Any data transfer entity along the path between the first entity 2 and the terminal device can be used as the data entity 11 shown in FIG. 1. For example, data transfer entity 11 can be a gateway entity that provides access to network 10 for the first entity 2, or it can be the final serving entity that provides service to the terminal device 4.

The data transfer entity 11 of FIG. 1 records one or more charging relevant parameters (such as the down-load time and/or the amount or volume of the first data object) related to the transfer of the first object to terminal device 4. Arrows 41 represent the request sent by the terminal device 4 to the second entity 3, for sending the second data object to the terminal device 4. For simplicity, it is shown that message 41 passes by data transfer entity 11, but it is noted that this request for the second data object could be sent via any suitable path between terminal device 4 and second entity 3, either through network 10 or over some other communication path.

In accordance with the example of FIG. 1, the data transfer entity 11 is furthermore controlled in such a way that it makes the providing of the one or more recorded charging relevant parameters associated with the first data object dependent on the receipt of a predetermined message 31 from the second entity 3, where the second entity 3 only outputs said message 31 after having received the request 41 for sending the second data object. In other words, the process of performing a charging and billing operation on the basis of the one or more recorded charging relevant parameters is postponed until message 31 is sent from the second entity 3 to the data transfer entity 11. In this way, if the user of terminal device 4 and no other entity ever requests the second data object, then it is possible to prevent that costs are charged or billed on the basis of the charging relevant parameters recorded for the transfer of the first data object. Additionally, if the sending of the second data object is requested, it is possible to make the charging dependent on the point in time of said request.

Figure 2:
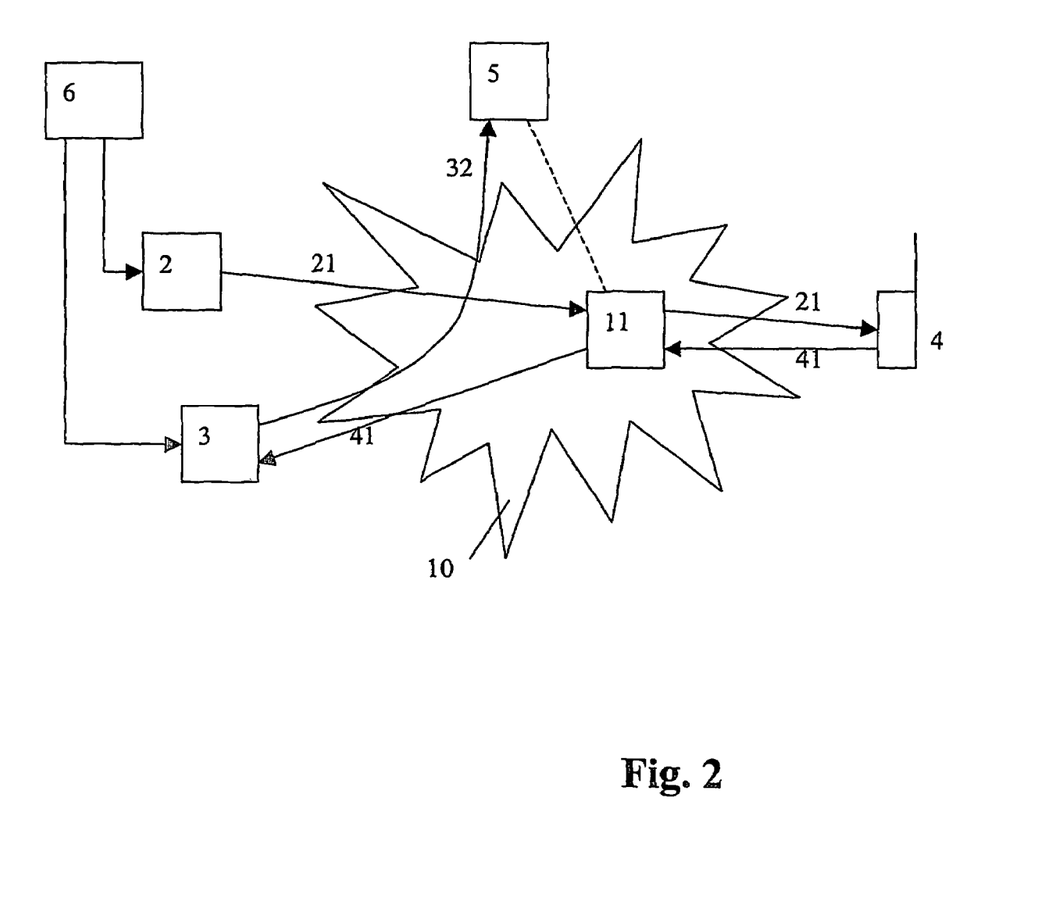
FIG. 2 shows a schematic representation of a communication system to which the present invention can be applied in another aspect.

FIG. 2 shows a communication system that is very similar to that of FIG. 1, and where the same units, entities and messages bear the same reference numerals as in FIG. 1, such that a repeated description is not necessary. As can be seen, in the system of FIG. 2, the first entity 2 sends the first data object to terminal device 4 in a message 21, and the terminal device 4 requests the sending of the second data object with a message 41. In contrast to the example of FIG. 1, the second entity 3 is controlled to output a predetermined message 32 to the charging entity 5 subsequent to receiving the request 41, and the charging entity 5 is controlled to make the processing of the one or more charging relevant parameters related to the transfer of the first data object dependent on the receipt of said message 32. The predetermined message 32 is shown as being transmitted through network 10 from the second entity 3 to the charging entity 5. It is noted that it could also be transported over any other suitable communication path in or outside of network 10.

The effect of the example in FIG. 2 is the same as in the example of FIG. 1, namely that a charging or billing on the basis of the one or more charging relevant parameters recorded for the transfer of the first data object is dependent on the second entity receiving a request for the second data object.

It may be noted that the concepts of FIGS. 1 and 2 can be combined, i.e. that upon receiving the request 41 for sending the second data object, the second entity 3 can output a message 31 to data transfer entity 11 and a message 32 to charging entity 5, each message 31, 32 informing the respective destination entity that a previously postponed billing operation based on the recorded charging relevant parameters for the first data object can be enabled.

The charging relevant parameters recorded by the data transfer entity 11 can be such that one or more of said parameters is communicated from the first entity 2 to the data transfer entity 11. For example, the amount or volume of data sent with the first data object is known to the first entity 2 and can directly be communicated to the data transfer entity 11. Equally, the data transfer entity 11 can be arranged to measure one or more charging relevant parameters while transferring the first data object, e.g. the amount of time necessary for conducting the transfer. Naturally, the data transfer entity 11 can also measure the amount or volume of data associated with the first data object.

Preferably, the second entity 3 in the examples of both FIGS. 1 and 2 is arranged to run a clean-up procedure in the course of which it is possible to delete second data objects. For example, the second entity 3 can be arranged to perform such a clean-up procedure on the basis of a predetermined time period since storing a given second data object. In other words, if no request for sending a second data object is received within a predetermined time since storing the object, it is deleted. Other clean-up mechanisms are possible, e.g. each second data object may have an expiration date set within itself, said expiration date indicating when to delete said second data object. In accordance with this preferred implementation of the second entity that has the clean-up feature, the second entity sends a notification message that informs of the deleting of the second data object to one or both of the data transfer entity 11 and the charging entity 5. The data transfer entity 11 and/or the charging entity 5 are then arranged to delete the one or more charging relevant parameters related to the transfer of the first data object that is associated with the deleted second data object, in response to receiving this notification message.

Now various examples of implementing the basic concepts described above in connection with FIGS. 1 and 2 shall be described on the basis of FIGS. 3 to 7. For simplicity, the request for sending the second data object to the terminal device is always shown as originating at the terminal device. This is in fact a preferred implementation, as the user of the terminal device thereby has a measure of control. However, it is equally possible that the request for sending the second data object to the terminal device is output by some other entity in or outside of the communication network, e.g. by an advertiser performing a network-push operation.

Figure 3:
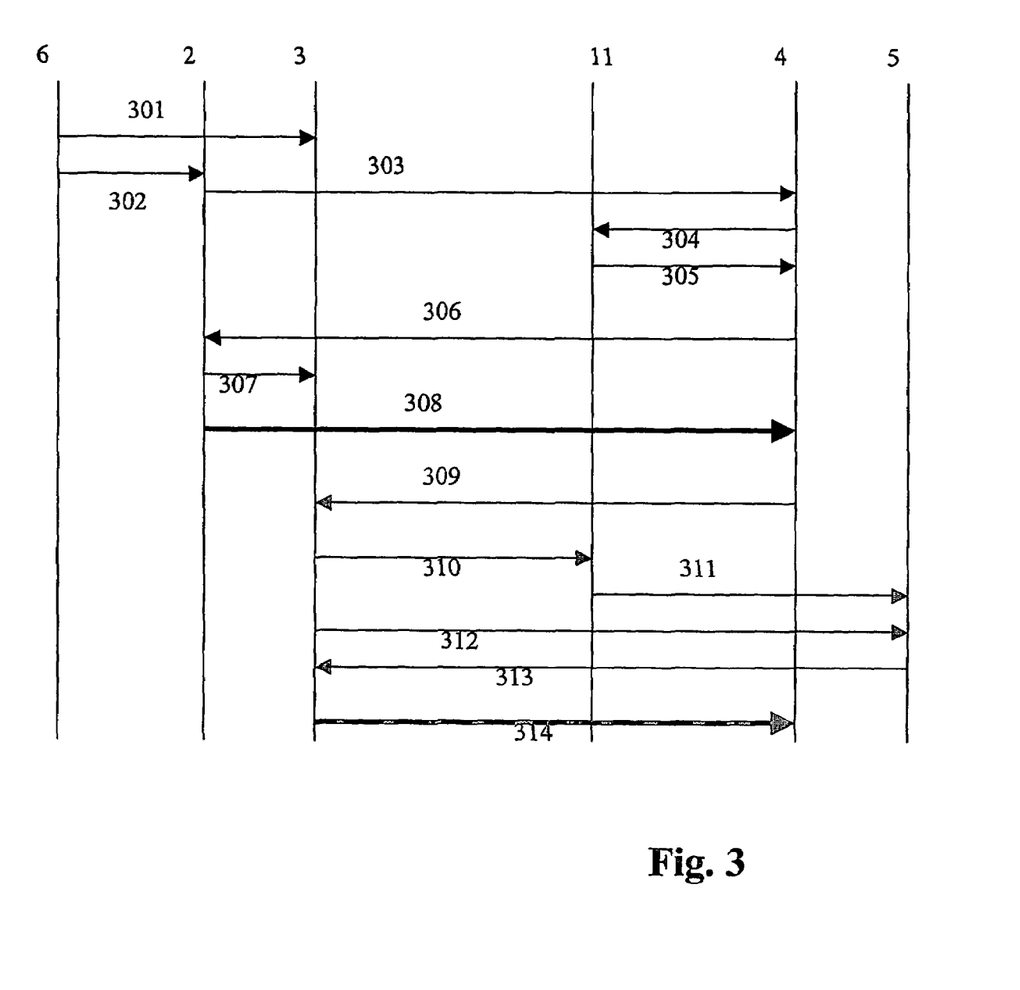
FIG. 3 shows a schematic representation of signalling associated with an embodiment of the invention.

FIG. 3 shows a schematic example of signals exchanged between entities operating according to the concept explained in connection with FIG. 1. Each vertical line relates to an entity indicated at the top, where the reference numerals for the entities are the same as used in FIG. 1.

Initially, the source 6 of the first and second data object sends the first data object to the first entity in message 302, and the second data object to a second entity 3 in message 301.

The first entity 2 can be arranged to determine whether the first data object is to be treated in such a way that the charging of the transfer is to be postponed until the second data object associated with the first data object is requested and retrieved. This decision can be conducted in any suitable or desirable way, e.g. on the basis of the type of data (or type of content) in the first data object, on the basis of the provider of said first data object, on the basis of the end-user (terminal 4), or any combination of these criteria. It may also be noted that the indication that the charging of transfer related parameters for the given first data unit is to be postponed, can also be given from the source 6 to the first entity 2 as a part of message 302, in which case the first entity 2 does not itself have to conduct any decision procedure.

With message 303, the first entity 2 informs the terminal device 4 that charging on the basis of parameters related to the transfer of the first data object is to be postponed until the second data object is requested. In response thereto, the terminal device 4 sends a control message to the data transfer entity 11, said control message containing control information for postponing the providing of the one or more charging relevant parameters until the receipt of a predetermined message from the second entity 3. This control message 304 may be a request message or a command message. In the request message, the data transfer entity 11 is asked to postpone the forwarding and the data transfer entity 11 may grant or refuse the request, whereas if the control message is a command message, then the data transfer entity 11 has no choice but to follow the command. In the event that the data transfer entity 11 has a decision to make, it is possible that this decision can also be conducted by another entity in or outside of the network, which possibility is not shown in FIG. 3 for the purpose of simplicity.

The data transfer entity 11 responds to the control message 304 by sending a message 305, which can be a granting or refusing of the request if message 304 was a request, or a simple acknowledgement of receiving a command if message 304 was a command. The terminal device 4 can optionally notify the user of the device of the information received in message 305, by any suitable or desirable means, e.g. via a display provided on terminal device 4.

In response to receiving message 305, the terminal device 4 forwards the received answer to first entity 2 in message 306. The first entity 2 can then inform the second entity 3 of this with message 307. It may be noted that message 306 may also contain addressing information identifying the address of data transfer entity 11, where this address information is also passed on to second entity 3 in message 307.

It is observed that as an alternative to messages 303 to 307, it is also possible that the first entity 2 first queries the terminal device 4 about the address of data transfer entity 11, and after having received this address, sending the control message containing a request or command directly to the data transfer entity 11.

It is also noted that the first and second entities 2, 3 can obtain the addressing information for terminal device 4 in any suitable or desirable way. For example, the address of terminal device 4 can be provided together with the first and second data object, or the source 6 for first and second data objects can provide appropriate lists of terminal device addresses of all terminal devices to which first data objects are to be provided.

Returning to the example of FIG. 3, arrow 308 represents transferring the first data object from first entity 2 to terminal device 4. This transfer is conducted via data transfer entity 11, which records one or more charging relevant parameters associated with said transfer of the first data object. As already specified, the parameter values can be gained by measuring the data transfer and/or by receiving the parameter values from the first entity 2.

In the example of FIG. 3, it is assumed that the user of terminal device 4 eventually decides to obtain the second data object associated with the first data object, and consequently a message 309 requesting said second data object is sent from the terminal device 4 to the second entity 3. The terminal device 4 can obtain the address of second entity 3 in any suitable or desirable way, where it is generally preferable to provide this address to the terminal device 4 as a part of message 308, i.e. together with the first data object.

In response to receiving the request in message 309, the second entity 3 sends a triggering message 310 to data transfer entity 11. This triggering message 310 is the predetermined message that lets data transfer entity 11 forward the one or more charging relevant parameters associated with the transfer of the first data object to the charging entity 5, see message 311. The charging entity 5 can then conduct a charging and billing operation on the basis of these parameters as is suitable or desirable.

In principle, the second entity 3 can directly respond to the request 309 by sending the second data object in a message 314. However, in the example of FIG. 3 an option is included according to which the second entity 3 first sends a message 312 to the charging entity 5, said message 312 containing information on the second data object requested by the user of terminal device 4. For example, it is possible that there are a variety of second data objects, where the selection of a given data object can be conducted automatically on the basis of the type of the first data object, and/or based on a selection made by the user of terminal device 4 with message 309. For example, if the first object is a content object and the content object is a piece of music, then there can be the option of the second data object being a first type of rights object (e.g. for listening to the piece of music once) or a second type of rights objects (e.g. for listening to the piece of music a given number of times or an indeterminate number of times), where the costs of the first type of right are different from the costs of the second type of rights, but the billing operation associated with downloading the second data object is also handled by the charging entity 5.

In response to receiving message 312, charging entity 5 makes a decision on whether the second entity 3 should indeed provide the requested second data object (e.g. on the basis of the funds assigned to the requesting user), such that the second entity 3 will only send the second data object 314 in response to an acknowledgement message 313 from charging entity 5, in which the sending of the second data object is given an OK.

In other words, the option indicated by messages 312, 313 consists in controlling the second entity 3 to send the information message 312 to charging entity 5, where the information message 312 comprises information associated with the second data object, and controlling the second entity 3 to make the sending of the second data object dependent on receiving an enable message 313 from the charging entity 5. The charging entity 5 is controlled to conduct an enable message output procedure in response to receiving the information message 312, comprising a decision step of whether or not to output the enable message 313. The decision step depends on the information contained in information message 312, and possibly also on other information, e.g. the above-mentioned fund information related to a particular user requesting a particular second data object.

As already remarked above, several variations of the example of FIG. 3 are possible, and it should also be remarked that the sequence of many messages can be changed without changing the accomplished effect. Also, the operations started by first entity 2 with messages 303 and 306 can also be performed by the second entity 3.

Figure 4:
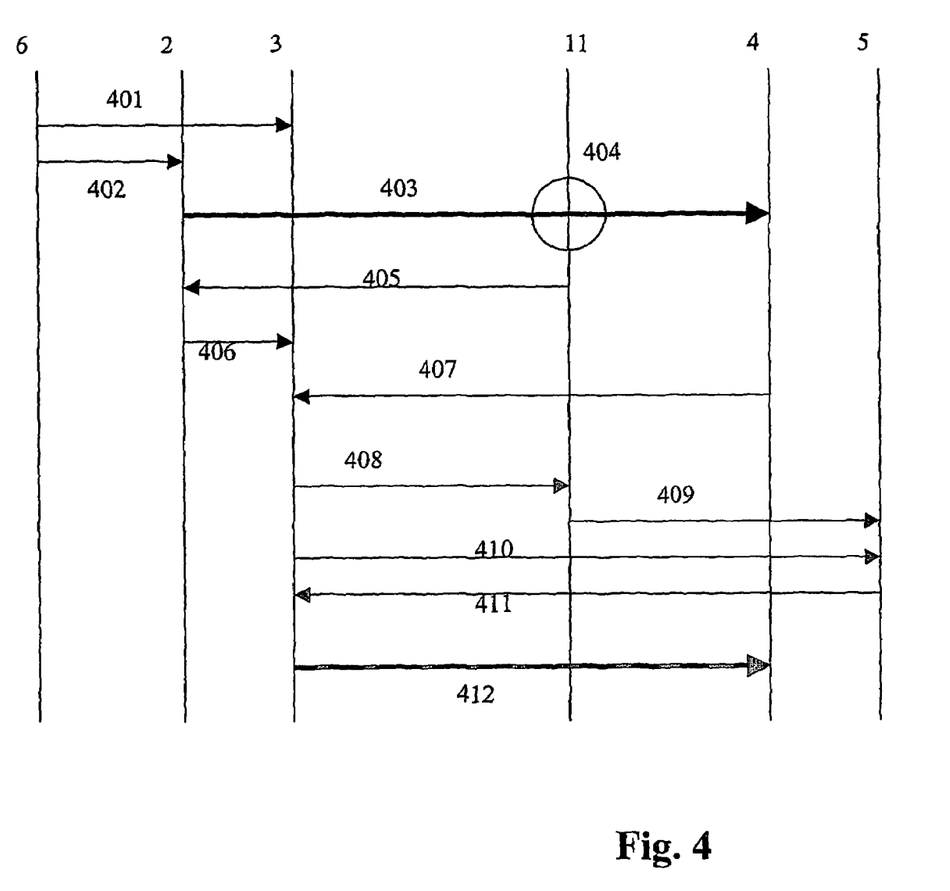
FIG. 4 shows a schematic representation of signalling associated with another embodiment of the invention.

FIG. 4 shows another embodiment of the invention. Initially, the source of the first and second data object 6 sends the first and second data objects to the first and second entities 2, 3, see messages 401 and 402. Messages 401 and 402 are identical to messages 301, 302 shown in FIG. 3, such that a renewed description is not necessary. In the embodiment of FIG. 4, the first entity 2 immediately sends the first data object to terminal device 4 in a message 403. In the embodiment of FIG. 4, the data transfer entity 11 is arranged to perform an analysis of the first data object during its transfer, which is symbolized by circle 404 in FIG. 4. Depending on the result of the analysis, the data transfer entity 11 initiates an operation of postponing the providing of charging relevant parameters associated with the transfer of the first data object, until receiving a predetermined message from the second entity 3. It is noted that the criteria for initiating or not initiating the postponement operation are the same as those described earlier, i.e. this may depend on the type of data in the first data object, the provider of said data, the end-user or any combination thereof.

The start for performing the analysis in data transfer entity 11 can be given in any desired or suitable way, e.g. by a constantly running monitoring procedure in the data transfer entity 11, or on the basis of a start message sent by the first entity 2 (this is not shown in FIG. 4 for simplicity). Such a start message could directly be sent from the first entity 2 to the data transfer entity 11, or via the terminal device 4. Similar to such a start message, first entity 2 can also be arranged to send a stop message for stopping the performing of the analysis at data transfer entity 11. Instead of such dedicated start/stop messages, it is also possible to add a leading information packet to message 403 for starting the analysis operation and/or a trailing stop packet for stopping the analysis.

Then the data transfer entity 11 sends a message 405 to the first entity 2, which message 405 contains coordination information, such as the acknowledgement that an analysis is being performed and that the data transfer entity 11 will postpone forwarding the charging relevant parameters related to the transfer of the first object until receiving an appropriate triggering message. Preferably, message 405 also contains the address of data transfer entity 11, which address may be passed onto the second entity 3 in message 406.

In the example of FIG. 4 it is assumed that the user of terminal device 4 sends a request message 407 to second entity 3, for requesting the second data object. In response thereto, the second entity 3 sends the predetermined triggering message 408 (which corresponds to message 31 in FIG. 1) to the data transfer entity 11, such that the data transfer entity may forward the charging relevant parameters associated with the transfer of the first data object to charging entity 5 in message 409. It is noted that messages 407 to 412 fully correspond to messages 309 to 314, respectively, described in connection with FIG. 3, such that a further description of these messages and the associated control procedures and the alternatives at respective entities is not necessary.

Now, with respect to FIGS. 5 to 7 examples of signalling that correspond to the concept described in connection with FIG. 2 shall be described.

Figure 5:
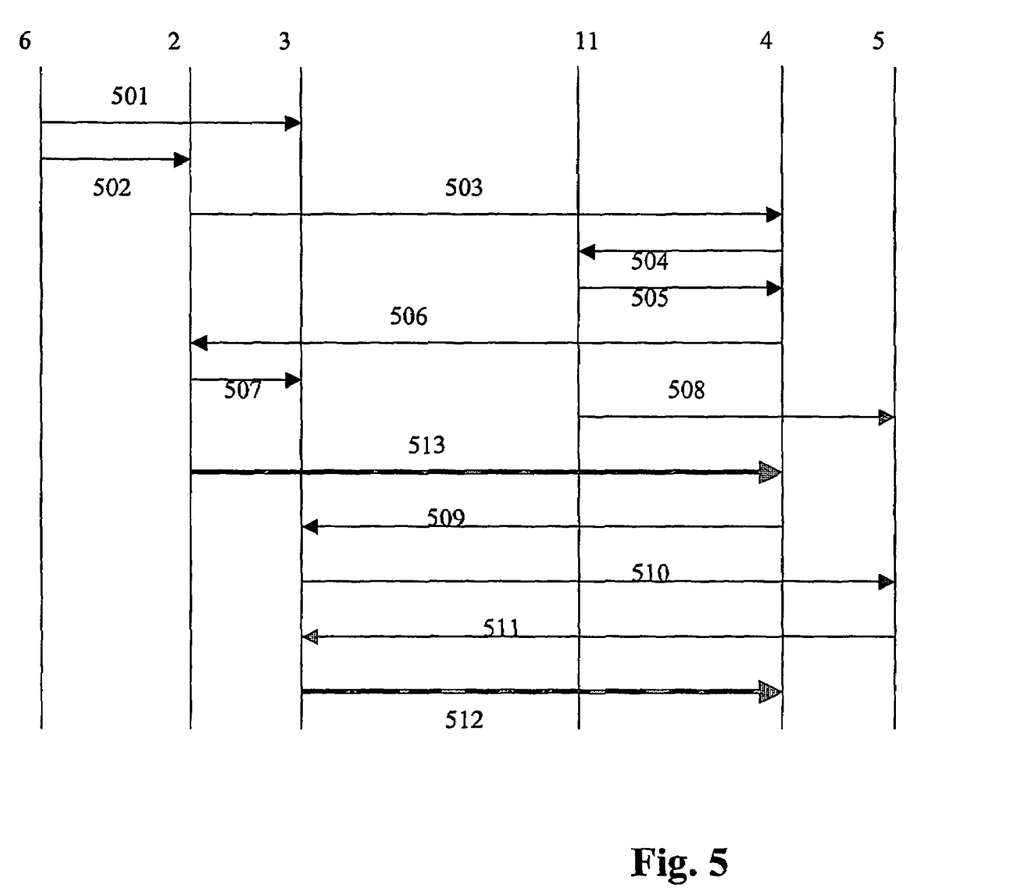
FIG. 5 shows a schematic representation of signalling associated with a another embodiment of the invention.

In the example of FIG. 5, the messages 501 and 502 and associated control operations in entities 2, 3 and 6 are identical to those described in connection with messages 301, 302 or 401, 402 in FIGS. 3 and 4, such that a renewed description is not necessary.

With message 503, the first entity 2 sends information to terminal device 4, said information indicating that the charging and billing operation on the basis of the transfer related parameters associated with the first data object is to be postponed until a predetermined triggering message is issued by the second entity 3. The control procedures leading to message 503, and message 503 itself correspond to the control procedures leading up to message 303 and message 303 itself as described in connection with FIG. 3, such that a renewed description is not necessary here.

In response to receiving message 503, the terminal device sends a control message 504 to data transfer entity 11, similar to what was described in connection with message 304 in FIG. 3, such that a renewed description is not necessary. Consequently, the response message 505 fully corresponds to message 305 of FIG. 3. The response on the part of the terminal device 4 is message 506, which corresponds to message 306 of FIG. 3, just as message 507 corresponds to message 307 of FIG. 3.

However, in departure from the example of FIG. 3, the control operation shown in FIG. 5 has the message 508, with which the data transfer entity 11 sends a control message to charging entity 5, to postpone the processing of charging relevant parameters related to the transfer of the first data object until receiving a predetermined triggering message from second entity 3. Control message 508 can be a request message or a command message.

Due to the fact that the charging operation is postponed at the charging entity 5, the data transfer entity 11 can be operated to forward the charging related parameters to the charging entity 5 as in a conventional data transfer entity. However, it is also possible to additionally implement a postponement at the data transfer entity 11, and to have both the data transfer entity 11 and the charging entity 5 wait for a triggering message from the second entity 3. This is, however, not shown in FIG. 5.

It may be noted that one benefit of sending the postponement control message 508 to charging entity 5 at this stage is that a prepaid account can be checked to see whether the end-user to which the first data object is to be sent has enough credit for the transfer related charging, e.g. for the volume if charging is based on volume. As a consequence, as an additional option, charging entity 5 can be arranged to perform such a check and return a corresponding acknowledgement to the data transfer entity 11 (not shown in FIG. 5).

Returning to FIG. 5, in summary the operation is such that the control message 508 is sent from data transfer entity 11 to charging entity 5, and prior to sending control message 508, a request message 504 is sent from terminal device 4 to data transfer entity 11 for requesting the data transfer entity 11 to send the control message 508 to charging entity 5.

In the example of FIG. 5, the first entity 2 sends the first data object in a message 513 to terminal device 4. It is assumed that eventually the user of terminal 4 sends a request 509 for the second data object, in response to which the second entity 3 sends a predetermined message 510 that corresponds to the predetermined message 32 shown in FIG. 2. Namely, this message 510 serves to trigger the further processing of the transfer related parameters associated with the transfer of the first data object, said transfer related parameters having been forwarded from the data transfer entity 11 to the charging entity 5 (not shown in FIG. 5). Message 510 will preferably be also contain further information, such as information on the second data object that is relevant for charging and billing.

It is in principle possible that the second entity 3 immediately sends the second data object to the requesting terminal device 4 upon receiving the request 509, but in the example of FIG. 5 an additional procedure is implemented, according to which the charging entity 5 first analyses the information received in message 510 and decides whether to allow a sending of the second data object or not. This is similar to what is described in connection with messages 312, 313 in FIG. 3, such that a renewed description is not necessary. If the charging entity 5 allows the providing of the second data object, see message 511, then the second entity 3 provides the second data object in message 512.

Figure 6:
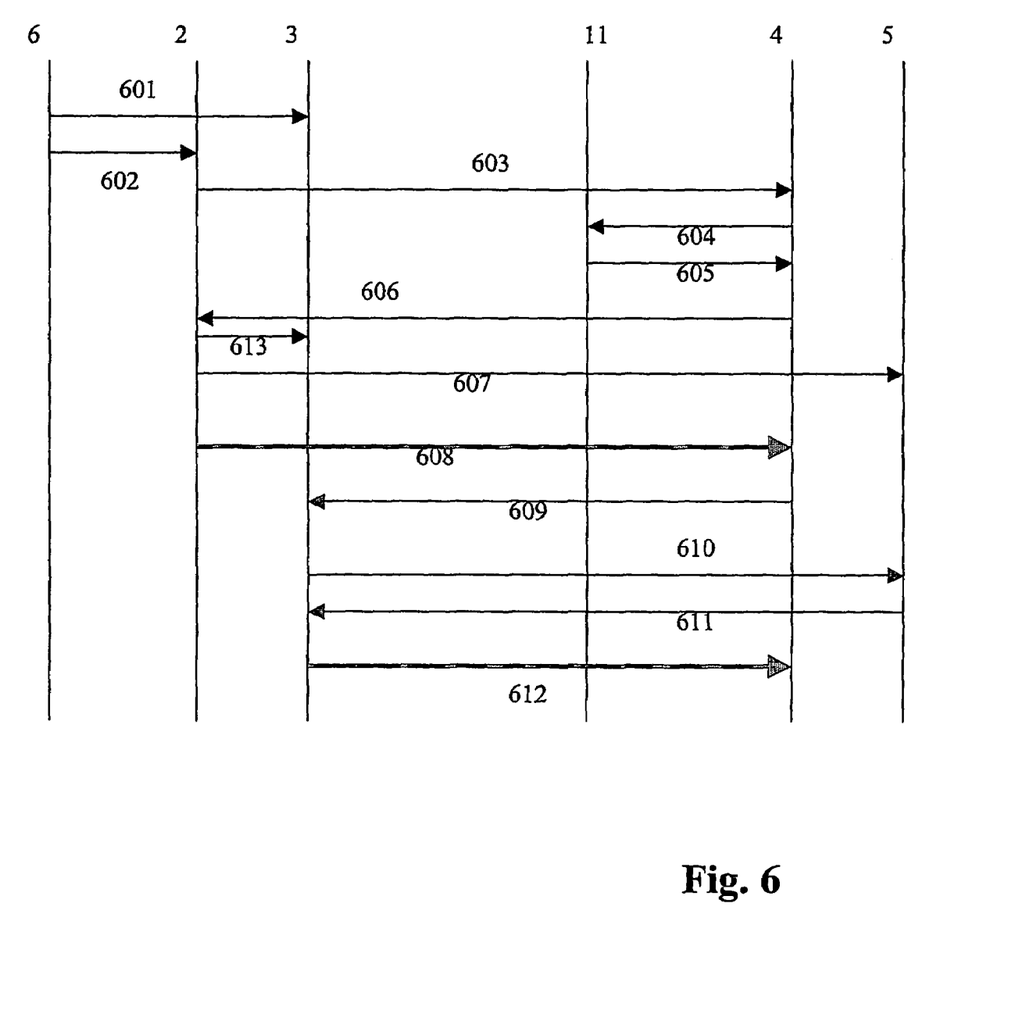
FIG. 6 shows a schematic representation of signalling associated with another embodiment of the invention.

FIG. 6 shows another embodiment of the present invention. The messages 601, 602 and the corresponding control operations in entities 2, 3 and 6 are identical to those described in connection with messages 301, 302 with respect to FIG. 3, such that a renewed description is not necessary.

Similar to message 508 described in connection with FIG. 5, in the example of FIG. 6 a control message 607 is sent to the charging entity for postponing the processing of the one or more charging relevant parameters related to the transfer of the first data object until receiving a predetermined message from the second entity 3. However, in contrast to FIG. 5, this control message 607 is not provided by the data transfer entity 11, but much rather is sent by the first entity 2. In order to do this, an address acquisition procedure is conducted for providing address information identifying the charging entity 5 to entity 2. This comprises sending an address information request message 604 to the data transfer entity 11. Preferably, this is done via the terminal device 4 with a message 603. If the messaging is done via terminal device 4, then data transfer entity responds with a return message 605, containing the desired address information, which is then forwarded to the first entity 2 in a message 606. The information is also provided to the second entity 3 in message 613.

Optionally, messages 603 to 606 and the corresponding control procedure can be similar to that of messages 503 to 506, respectively, described in connection with FIG. 5. In other words, the control message 604 can also contain a request for asking the data transfer entity 11 to decide whether or not the charging on the basis of charging related parameters associated with the transfer of the first data object should be postponed. In this case, message 605 contains the grant or refusal of said request.

Subsequent to sending control message 607, the first entity 2 sends the first data object in a message 608 to the terminal device 4. In FIG. 6 it is assumed that eventually the user of terminal device 4 requests the second data object with a message 609. It is noted that the messages and accompanying operation for messages 609 to 612 are identical to what has been described in connection with messages 509 to 512 respectively, in FIG. 5, such that a renewed description is not necessary.

Figure 7:
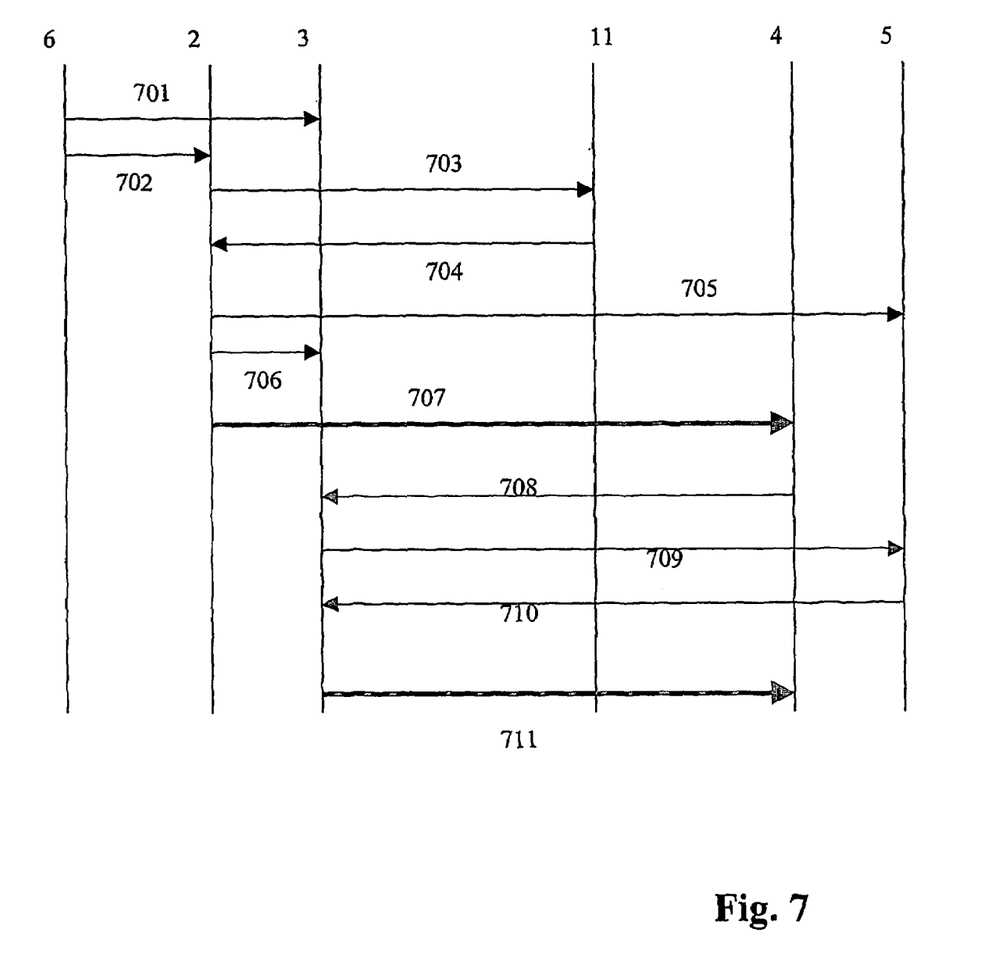
FIG. 7 shows a schematic representation of signalling associated with yet another embodiment of the invention.

FIG. 7 shows a further embodiment, in which the charging entity 5 receives a control message 705 for postponing the processing of charge related parameter values associated with the transfer of the first data object. Similar to the example of FIG. 6, the control message 705 is sent by first entity 2 to charging entity 5. However, in contrast to the example of FIG. 6, the request for addressing information on charging entity 5 is sent directly from the first entity 2 to the data transfer entity 11 in a message 703, to which the data transfer entity 11 responds with message 704. It is noted that there may be a message interchange prior to message 703 between the first entity 2 and the terminal device 4, in order to obtain addressing information relating to the data transfer entity 11 (this procedure not being shown in FIG. 7). It is noted that the remaining signalling and control procedures correspond to those of FIG. 6, more precisely message 706 corresponds to message 613, and messages 707 to 711 correspond to messages 608 to 612, respectively. Consequently, a renewed description is not necessary.

Optionally, messages 703, 704 and the corresponding control procedure can be similar to that of messages 503 to 506, respectively, described in connection with FIG. 5. In other words, the control message 703 can also contain a request for asking the data transfer entity 11 to decide whether or not the charging on the basis of charging related parameters associated with the transfer of the first data object should be postponed. In this case, message 704 contains the grant or refusal of said request.

It is noted that the present invention not only relates to methods for controlling the overall communication system described in connection with FIGS. 1 and 2, but also to methods of controlling the individual entities in accordance with the above described concepts, and also the invention relates to the entities themselves as embodied to operate in accordance with such control procedures. In this case the entities are preferably embodied as operating on a given server of the communication system.

More specifically, the invention thereby also relates to a method of controlling a server that acts as the second entity 3, where the server is controlled to output the predetermined message 31 to the data transfer entity 11 subsequent to receiving a request for the second data object from the terminal device 4, to thereby trigger the data transfer entity 11 to provide the recorded charging relevant parameters to the charging entity 5.

Furthermore, the invention relates to a control method and server arranged to act as the data transfer entity 11, where the server is controlled so as to make the providing of one or more charging relevant parameters related to the transfer of the first data object dependent on the receipt of the predetermined triggering message from the second entity 3.

Furthermore, the invention relates to a server acting as said charging entity 5, where the server is controlled so as to make the processing of one or more charging relevant parameters that were received from the data transfer entity 11 and relate to the transfer of the first data object, dependent on the receipt of the predetermined triggering message from the second entity.

Furthermore, the invention also relates to a method of controlling the terminal device 4 and to an appropriately arranged terminal device 4, in which the terminal device sends a predetermined control message to the data transfer entity 11, where the control message contains control information for controlling the data transfer entity 11 to postpone the providing of one or more charging relevant parameters related to the transfer of the first data object until the data transfer entity receives the predetermined triggering message from the second entity 3.

It is furthermore noted that the above-described control methods can be embodied in the form of computer software, and can consequently also be embodied in the form of data storage elements or data carriers holding such computer software.

Although the present invention has been described on the basis of preferred detailed embodiments, these detailed embodiments only serve to provide a more comprehensive understanding and are not intended to be limiting. Reference numerals in the claims serve to make the claims easier to read, but are not intended to be limiting.

The invention claimed is:

1. A method of controlling an operation of a communication system, said system comprising:
   a first entity for sending a first data object to a terminal device,
   a second entity for sending a second data object to said terminal device, said second data object having a predetermined association with said first data object,
   a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
   a charging entity for collecting and processing charging information related to the providing of communication services by said communication network, said data transfer entity being adapted for providing recorded charging relevant parameters to said charging entity,
   said method comprising:
   controlling said first entity to send said first data object to said terminal device,
   controlling said data transfer entity to record one or more charging relevant parameters related to the transfer of said first data object to said terminal device,
   controlling said second entity to output a predetermined message to said data transfer entity subsequent to receiving a request for sending said second data object to said terminal device, and
   controlling said data transfer entity to make the providing of said one or more charging relevant parameters related to the transfer of said first data object dependent on the receipt of said predetermined message.

2. The method of claim 1, further comprising sending a predetermined control message to said data transfer entity prior to controlling said first entity to send said first data object to said terminal device, said control message containing control information for postponing the providing of said one or more charging relevant parameters until the receipt of said predetermined message.

3. The method of claim 2, wherein said control message is sent from said terminal device to said data transfer entity.

4. The method of claim 2, wherein said control message is a request message or a command message.

5. The method of claim 1, further comprising controlling said data transfer entity to perform an analysis of said first data object during its transfer and, depending on a result of said analysis, to initiate an operation of postponing the providing of said one or more charging relevant parameters until the receipt of said predetermined message.

6. A method of controlling an operation of a communication system, wherein said communication system comprises:
   a first entity for sending a first data object to a terminal device,
   a second entity for sending a second data object to said terminal device, said second data object having a predetermined association with said first data object,
   a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
   a charging entity for collecting and processing charging information related to the providing of communication services by said communication network, said data transfer entity being adapted for providing recorded charging relevant parameters to said charging entity,
   said method comprising:
   controlling said first entity to send said first data object to said terminal device, controlling said data transfer entity to record one or more charging relevant parameters related to the transfer of said first data object to said terminal device,
   controlling said second entity to output a predetermined message to said charging entity subsequent to receiving a request for sending said second data object to said terminal device, and controlling said charging entity to make the processing of one or more charging relevant parameters related to the transfer of said first data object dependent on the receipt of said predetermined message.

7. The method of claim 6, further comprising sending a predetermined control message to said charging entity prior to controlling said first entity to send said first data object to said terminal device, said control message containing control information for postponing the processing of said one or more charging relevant parameters until the receipt of said predetermined message.

8. The method of claim 6, wherein said control message is a request message or a command message.

9. The method of claim 7, wherein said control message is sent from said data transfer entity to said charging entity.

10. The method of claim 9, wherein prior to sending said control message from said data transfer entity to said charging entity, a request message is sent from said terminal device to said data transfer entity for requesting said data transfer entity to send said control message.

11. The method of claim 7, wherein said control message is sent to said charging entity from a control message source, said control message source being said first or said second entity.

12. The method of claim 11, wherein prior to sending said control message from said control message source to said charging entity, an address acquisition procedure for providing address information on the charging entity to said control message source is conducted, said address acquisition procedure comprising sending an address information request message to said data transfer entity.

13. The method of claim 12, wherein said address information request message is sent directly from said control message source to said data transfer entity.

14. The method of claim 12, wherein said address information request message is sent from said control message source to said data transfer entity via said terminal device.

15. The method of claim 6, wherein at least one of said at one or more charging relevant parameters related to the transfer of said first data object is communicated from said first entity to said data transfer entity.

16. The method of claim 6, wherein at least one of said at one or more charging relevant parameters related to the transfer of said first data object is measured by said data transfer entity during the transfer of said first data object.

17. The method of claim 6, further comprising, subsequent to said second entity having received said request for sending said second data object,
controlling said second entity to send an information message to said charging entity, said information message comprising information associated with said second data object, and controlling said second entity to make the sending of said second data object dependent on receiving an enable message from said charging entity, and
controlling said charging entity to conduct an enable message output procedure in response to receiving said information message, comprising a decision step of whether or not to output said enable message that depends on the information contained in said information message.

18. The method of claim 6, further comprising:
controlling said second entity to delete said second data object and to send a notification message that informs of said deleting to one or both of said data transfer entity and said charging entity if no request for sending said second data object to said terminal device is received within a predetermined time period since storing said second data object at said second entity, and
controlling one or both of said data transfer entity and said charging entity to delete said one or more charging relevant parameters related to the transfer of said first data object in response to receiving said notification message.

19. The method of claim 6, wherein said first data object comprises data to be accessed by a user of said terminal device, and said second data object comprises data for enabling access to the data of said first data object.

20. The method of claim 6, wherein said request for sending said second data object to said terminal device is output by said terminal device.

21. A method of controlling a server in a communication system, wherein said communication system comprises:
a first entity for sending a first data object to a terminal device,
a second entity for sending a second data object to said terminal device, said second data object having a predetermined association with said first data object,
a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
a charging entity for collecting and processing charging information related to the providing of communication services by said communication network, said data transfer entity being adapted for providing recorded charging relevant parameters to said charging entity,
said server comprising said second entity and said method comprising:
controlling said second entity to output a predetermined message to said data transfer entity subsequent to receiving a request for sending said second data object to said terminal device, for triggering said data transfer entity to provide recorded charging relevant parameters associated with the transfer of said first data object to said charging entity.

22. The method of claim 21, further comprising, subsequent to said second entity having received said request for sending said second data object, controlling said second entity to send an information message to said charging entity, said information message comprising information associated with said second data object, and controlling said second entity to make the sending of said second data object dependent on receiving an enable message from said charging entity.

23. The method of claim 21, further comprising controlling said second entity to delete said second data object and to send a notification message that informs of said deleting to one or both of said data transfer entity and said charging entity if no request for sending said second data object to said terminal device is received within a predetermined time period since storing said second data object at said second entity.

24. A server coupled to a communication system, wherein said communication system comprises:
a first entity for sending a first data object to a terminal device,
a second entity for sending a second data object to said terminal device, said second data object having a predetermined association with said first data object,
a data transfer entity for transferring data to said terminal device and recording one or more charging relevant parameters associated with the transfer of data to said terminal device, said data transfer entity being adapted to transfer said first data object to said terminal device, and said data transfer entity being part of a communication network, a charging entity for collecting and processing charging information related to the providing of communication services by said communication network, said data transfer entity being adapted for providing recorded charging relevant parameters to said charging entity, said server comprising:

said second entity and said server being adapted to conduct a control procedure for controlling said second entity to output a predetermined message to said data-transfer entity subsequent to receiving a request for sending said second data object to said terminal device, for triggering said data transfer entity to provide recorded charging relevant parameters associated with the transfer of said first data object to said charging entity.

25. The server of claim 24, wherein said control procedure is arranged for, subsequent to said second entity having received said request for sending said second data object, controlling said second entity to send an information message to said charging entity, said information message comprising information associated with said second data object, and controlling said second entity to make the sending of said second data object dependent on receiving an enable message from said charging entity.

26. The server of claim 24, wherein said control procedure is arranged for controlling said second entity to delete said second data object and to send a notification message that informs of said deleting to one or both of said data transfer entity and said charging entity if no request for sending said second data object to said terminal device is received within a predetermined time period since storing said second data object at said second entity.

27. A method of controlling a server in a communication system, wherein said communication system comprises a first entity for sending a first data object to a terminal device, a second entity for sending a second data object to said terminal device, said second data object having a predetermined association with said first data object, a data transfer entity for transferring data to said terminal device and recording one or more charging relevant parameters associated with the transfer of data to said terminal device, said data transfer entity being adapted to transfer said first data object to said terminal device, and said data transfer entity being part of a communication network, a charging entity for collecting and processing charging information related to the providing of communication services by said communication network, said data transfer entity being adapted for providing recorded charging relevant parameters to said charging entity, said server comprising said data transfer entity and said method comprising:

controlling said data transfer entity to make the providing of said one or more charging relevant parameters related to the transfer of said first data object dependent on the receipt of a predetermined message from said second entity.

28. The method of claim 27, further comprising controlling said data transfer entity to postpone the providing of said one or more charging relevant parameters related to the transfer of said first data object in response to receiving a message containing a request or command for postponing the providing of said one or more charging relevant parameters until the receipt of said predetermined message.

29. The method of claim 27, further comprising controlling said data transfer entity to perform an analysis of said first data object during its transfer and, depending on a result of said analysis, to initiate an operation of postponing the providing of said one or more charging relevant parameters until the receipt of said predetermined message.

30. The method of claim 27, wherein said data transfer entity receives at least one of said one or more charging relevant parameters related to the transfer of said first data object from said first entity.

31. The method of claim 27, wherein at least one of said at one or more charging relevant parameters related to the transfer of said first data object is measured by said data transfer entity during the transfer of said first data object.

32. A server coupled to a communication system, wherein said communication system comprises:

a first entity for sending a first data object to a terminal device, a second entity for sending a second data object to said terminal device, said second data object having a predetermined association with said first data object, a data transfer entity for transferring data to said terminal device and recording one or more charging relevant parameters associated with the transfer of data to said terminal device, said data transfer entity being adapted to transfer said first data object to said terminal device, and said data transfer entity being part of a communication network, a charging entity for collecting and processing charging information related to the providing of communication services by said communication network, said data transfer entity being adapted for providing recorded charging relevant parameters to said charging entity, said server comprising:

said data transfer entity and said server being adapted to conduct a control procedure for controlling said data transfer entity to make the providing of said one or more charging relevant parameters related to the transfer of said first data object dependent on the receipt of a predetermined message from said second entity.

33. The server of claim 32, wherein said control procedure is arranged for controlling said data transfer entity to postpone the providing of said one or more charging relevant parameters related to the transfer of said first data object in response to receiving a message containing a request or command for postponing the providing of said one or more charging relevant parameters until the receipt of said predetermined message.

34. The server of claim 32, wherein said control procedure is arranged for controlling said data transfer entity to perform an analysis of said first data object during its transfer and, depending on a result of said analysis, to initiate an operation of postponing the providing of said one or more charging relevant parameters until the receipt of said predetermined message.

35. The server of claim 32 wherein said control procedure is arranged for letting said data transfer entity receive at least one of said one or more charging relevant parameters related to the transfer of said first data object from said first entity.

36. The server of claim 35, wherein said control procedure is arranged for controlling said data transfer entity to measure at least one of said at one or more charging relevant parameters related to the transfer of said first data object during the transfer of said first data object.

37. A method of controlling a server in a communication system, wherein said communication system comprises
- a first entity for sending a first data object to a terminal device,
- a second entity for sending a second data object to said terminal device, said second data object having a predetermined association with said first data object,
- a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
- a charging entity for collecting and processing charging information related to the providing of communication services by said communication network, said data transfer entity being adapted for providing recorded charging relevant parameters to said charging entity,
- said server comprising said charging entity and
- said method comprising:
  - controlling said charging entity to make the processing of one or more charging relevant parameters related to the transfer of said first data object dependent on the receipt of a predetermined message from said second entity.

38. The method of claim 37, further comprising controlling said charging entity to postpone the processing of said one or more charging relevant parameters related to the transfer of said first data object in response to receiving a message containing a request or command for postponing the processing of said one or more charging relevant parameters until the receipt of said predetermined message.

39. A server coupled to a communication system, wherein said communication system comprises:
- a first entity for sending a first data object to a terminal device,
- a second entity for sending a second data object to said terminal device, said second data object having a predetermined association with said first data object,
- a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
- a charging entity for collecting and processing charging information related to the providing of communication services by said communication network, said data transfer entity being adapted for providing recorded charging relevant parameters to said charging entity,
- said server comprising:
  - said charging entity and
  - said server being arranged to conduct a control procedure for controlling said charging entity to make the processing of one or more charging relevant parameters related to the transfer of said first data object dependent on the receipt of a predetermined message from said second entity.

40. The server of claim 39, wherein said control procedure is arranged for controlling said charging entity to postpone the processing of said one or more charging relevant parameters related to the transfer of said first data object in response to receiving a message containing a request or command for postponing the processing of said one or more charging relevant parameters until the receipt of said predetermined message.

41. A method of controlling a terminal device in a communication system, wherein said communication system comprises:
- a first entity for sending a first data object to said terminal device,
- a second entity for sending a second data object to said terminal device, said second data object having a predetermined association with said first data object,
- a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
- a charging entity for collecting and processing charging information related to the providing of communication services by said communication network, said data transfer entity being adapted for providing recorded charging relevant parameters to said charging entity,
- said method comprising:
  - controlling said terminal device to send a predetermined control message to said data transfer entity, said control message containing control information for controlling said data transfer entity to postpone the providing of one or more charging relevant parameters related to the transfer of said first data object until said data transfer entity receives a predetermined message from said second entity.

42. The method of claim 41, further comprising controlling said terminal device to send said predetermined control message in response to receiving from said first or second entity a request for sending said control message.

43. The method of claim 41, further comprising controlling said terminal device to output to said second entity a request for sending said second data object to said terminal device.

44. A terminal device in a communication system, wherein said communication system comprises:
- a first entity for sending a first data object to said terminal device,
- a second entity for sending a second data object to said terminal device, said second data object having a predetermined association with said first data object,
- a data transfer entity for transferring data to said terminal device and recording one or more charging relevant parameters associated with the transfer of data to said terminal device, said data transfer entity being adapted to transfer said first data object to said terminal device, and said data transfer entity being part of a communication network,
- a charging entity for collecting and processing charging information related to the providing of communication services by said communication network, said data transfer entity being adapted for providing recorded charging relevant parameters to said charging entity,
- said terminal device being adapted to conduct a control procedure for controlling said terminal device to send a predetermined control message to said data transfer entity, said control message containing control information for controlling said data transfer entity to postpone the providing of one or more charging relevant parameters related to the transfer of said first data object until said data transfer entity receives a predetermined message from said second entity.

45. The terminal device of claim 44, wherein said terminal device is adapted to send said predetermined control message in response to receiving from said first or second entity a request for sending said control message.

46. The terminal device of claim 44, being adapted to be controllable to output to said second entity a request for sending said second data object to said terminal device.

* * * * *

UNITED STATES PATENT AND TRADEMARK OFFICE
CERTIFICATE OF CORRECTION

PATENT NO. : 7,305,074 B2  Page 1 of 1
APPLICATION NO. : 10/544964
DATED : December 4, 2007
INVENTOR(S) : Hartung et al.

It is certified that error appears in the above-identified patent and that said Letters Patent is hereby corrected as shown below:

In Column 18, Line 63, in Claim 36, after "claim" delete "35" and insert -- 32 --, therefor.

Signed and Sealed this

Seventh Day of October, 2008

JON W. DUDAS
*Director of the United States Patent and Trademark Office*